US007271732B2

(12) United States Patent
Harada

(10) Patent No.: US 7,271,732 B2
(45) Date of Patent: Sep. 18, 2007

(54) REMOTE OPERATING APPARATUS AND REMOTE OPERATING SYSTEM

(75) Inventor: Koji Harada, Neyagawa (JP)

(73) Assignee: ONKYO Corporation, Neyagawa-shi (JP)

( * ) Notice: Subject to any disclaimer, the term of this patent is extended or adjusted under 35 U.S.C. 154(b) by 382 days.

(21) Appl. No.: 10/972,141

(22) Filed: Oct. 22, 2004

(65) Prior Publication Data

US 2005/0088278 A1 Apr. 28, 2005

(30) Foreign Application Priority Data

Oct. 27, 2003 (JP) ............................ 2003-366611

(51) Int. Cl.
*G05B 19/02* (2006.01)

(52) U.S. Cl. .............................. 340/825.22; 340/3.71; 340/825.25; 340/825.69; 341/176; 348/734

(58) Field of Classification Search ............... 340/3.71, 340/825.25, 825.69, 825.72; 341/176; 348/707, 348/706, 734; 398/111, 112
See application file for complete search history.

(56) References Cited

U.S. PATENT DOCUMENTS 4,866,542 A * 9/1989 Shimada et al. .............. 386/69
5,434,626 A * 7/1995 Hayashi et al. ............. 348/569

FOREIGN PATENT DOCUMENTS

EP 451872 A2 * 10/1991
JP 04-051698 2/1992
JP 08-088883 4/1996
JP 11-149682 * 6/1999

* cited by examiner

*Primary Examiner*—Edwin C. Holloway, III
(74) *Attorney, Agent, or Firm*—Renner, Otto, Boisselle & Sklar, LLP

(57) ABSTRACT

A remote operating apparatus includes a selection decision operating device, a controller, a first operation function changing button and a second operation function changing button for changing an operation function of the selection decision operating device. The controller controls the operation function of the selection decision operating device by receiving a signal from the first operation function changing button or the second operation function changing button and switches among a basic controlled state that enables one to select and decide a combination of a plurality of set values, the combination constituted of an operation mode set value of the remote operating apparatus and an input switching set value of a remote operated apparatus, by operation of the selection decision operating device, a first controlled state that enables one to select and decide an operation mode set value of the remote operating apparatus independently by operation of the selection decision operating device when the first operation function changing button is pressed, and a second controlled state that enables one to select and decide an input switching set value of the remote operated apparatus independently by operation of the selection decision operating device when the second operation function changing button is pressed.

10 Claims, 5 Drawing Sheets

REMOTE OPERATING APPARATUS AND REMOTE OPERATING SYSTEM

BACKGROUND OF THE INVENTION

1. Field of the Invention

The present invention relates to a remote operating apparatus and a remote operated apparatus as well as to a remote operating system constituted of these apparatus.

2. Description of the Related Art

In an AV system constituted, for example, of an AV amplifier, a DVD player, a CD player, a tuner and the like, these remote operated apparatus constituting the system can be remotely operated with a remote controller serving as a remote operating apparatus. A conventional AV amplifier includes an input selector to which a DVD player, a CD player, a tuner and the like are connected, and improves the operability by switching the input selector with the remote controller and changing the operation mode of the remote controller. For example, when the input switching of the AV amplifier is switched to the CD player by operation of the remote controller, operation of the CD player such as replay or stop or the like can be made with operating keys of the remote controller of the AV amplifier in which the operation mode has been changed. Also, the operation mode set value of the remote controller can be further changed by operation of an operation mode changing key, whereby another remote operated apparatus such as the tuner, for example, can be remotely operated without changing the input selector.

Conventionally, in the case of the above-described example, there is a system in which, when the operation mode of the remote controller is further changed by operation of the operation mode changing key, the switched operation mode is maintained for a predetermined period of time and after the predetermined period of time passes, the remote controller restores the operation function of the apparatus connected to the input selector before the current switching.

Further, a conventional remote operating apparatus aims at prevention of battery consumption and improvement of the operability by providing a roller and a detecting switch for detecting that the roller has been pressed, as a selection decision operating device.

However, in conventional remote operating apparatus and remote operated apparatus, even if the input selector is switched and the operation mode of the remote operating apparatus is changed, the improvement of operability has not been sufficient. When a user switches the input selector with a remote operating apparatus, the user cannot recognize that even the operation mode of the remote operating apparatus has been changed, thereby confusing the user. In addition, in an AV system, according as the number of apparatus connected to an AV amplifier increases, the number of remote operated apparatus that the user operates with the remote operating apparatus increases. Therefore, in addition to aiming at improvement of operability by combining the switching of the input selector with the change in the operation mode of the remote operating apparatus, it is necessary to construct a system in which the increasing number of remote operated apparatus can be operated easily and independently.

SUMMARY OF THE INVENTION

A representative object of the present invention is to improve the operability for a user in a remote operating apparatus and a remote operated apparatus such as an AV system and the like as well as in a remote operating system constituted of these apparatus, on one hand by suitably combining the switching of the input selector with the change in the operation mode of the remote operating apparatus and on the other hand by constructing a system in which the remote operated apparatus can be suitably operated independently.

In a replay system according to the present invention, the remote operating apparatus in accordance with the present invention is a remote operating apparatus including a selection decision operating device, a controller, and a first operation function changing button for changing an operation function of the selection decision operating device, wherein the controller controls the operation function of the selection decision operating device by receiving a signal from the first operation function changing button and switches between a basic controlled state that enables one to select and decide a combination of a plurality of set values, the combination constituted of an operation mode set value of the remote operating apparatus and an input switching set value of a remote operated apparatus, by operation of the selection decision operating device, and a first controlled state that enables one to select and decide an operation mode set value of the remote operating apparatus independently by operation of the selection decision operating device when the first operation function changing button is pressed.

The remote operating apparatus in accordance with the another invention is a remote operating apparatus comprising: a selection decision operating device; a controller; and a second operation function changing button for changing an operation function of the selection decision operating device, wherein the controller controls the operation function of the selection decision operating device by receiving a signal from the second operation function changing button and switches between: a basic controlled state that enables one to select and decide one combination of set values among a plurality of combinations of set values, the combination including an operation mode set value of the remote operating apparatus and an input switching set value of a remote operated apparatus, by operation of the selection decision operating device, and; a second controlled state that enables one to select and decide an input switching set value of the remote operated apparatus independently by operation of the selection decision operating device when the second operation function changing button is pressed.

The remote operating apparatus in accordance with the another invention is a remote operating apparatus comprising: a selection decision operating device; a controller, a first operation function changing button and a second operation function changing button for changing an operation function of the selection decision operating device; wherein the controller controls the operation function of the selection decision operating device by receiving a signal from the first operation function changing button or the second operation function changing button and switches among: a basic controlled state that enables one to select and decide one combination of set values among a plurality of combinations of set values, the combination including an operation mode set value of the remote operating apparatus and an input switching set value of a remote operated apparatus, by operation of the selection decision operating device, and; a first controlled state that enables one to select and decide an operation mode set value of the remote operating apparatus independently by operation of the selection decision operating device when the first operation function changing button is pressed; and a second controlled state that enables one to select and decide an input switching set value of the remote operated apparatus independently by operation of the selection decision operating device when the second operation function changing button is pressed.

Hereafter, the functions of the present invention will be described.

The remote operating apparatus of the present invention includes a selection decision operating device, and the operation function of the selection decision operating device can be switched among the basic controlled state, the first controlled state, and the second controlled state. Here, the basic controlled state refers to a state that enables one to select and decide a combination of a plurality of set values, the combination including an operation mode set value of the remote operating apparatus and an input switching set value of a remote operated apparatus, by operation of the selection decision operating device. The first controlled state refers to a state that enables one to select and decide an operation mode set value of the remote operating apparatus independently by operation of the selection decision operating device. The second controlled state refers to a state that enables one to select and decide an input switching set value of the remote controlled apparatus independently by operation of the selection decision operating device. The controller carries out the switching among the basic controlled state, the first controlled state, and the second controlled state when the first operation function changing button or the second operation function changing button is pressed, by receiving a signal from these buttons.

Therefore, in the remote operating apparatus of the present invention, the operation function of the selection decision operating device can be suitably switched, so that the operation mode of the remote operating device and the input switching of the remote operated apparatus can be easily controlled, thereby improving the operability for the user. In the basic controlled state, the operation mode set value of the remote operating apparatus and the input switching set value of the remote operated apparatus are interlocked, thereby facilitating the operation of the user in normal use. Further, in the first controlled state or in the second controlled state, the operation mode set value of the remote operating apparatus or the input switching set value of the remote operated apparatus can be selected independently, thereby raising the degrees of freedom in the operation of the user.

In a preferable embodiment, the remote operating apparatus of the present invention is such that the operation mode set values of the remote operating apparatus include an operation mode set value corresponding to the remote operated apparatus and an operation mode set value corresponding to another remote operated apparatus connected to an input of the remote operated apparatus.

Further, the remote operated apparatus of the present invention includes a receiver for receiving a remote operating signal that is transmitted from the remote operating apparatus, a controller, and an input switcher, wherein the controller controls the input switcher in accordance with the input switching set value of the remote operating signal. Therefore, the remote operating apparatus of the present invention can not only control the input switcher of the remote operated apparatus but also remotely operate another remote operated apparatus corresponding to the input, thereby improving the operability for the user.

In a preferable embodiment, the remote operating apparatus of the present invention includes a transmitter for transmitting a remote operating signal, and the selection decision operating device includes a cylindrical member supported to be freely revolvable and pressable, a revolution detector for detecting a revolution of the cylindrical member, and a pressing detector for detecting a pressing of the cylindrical member, wherein the controller determines selection and decision by a signal from the revolution detector and the pressing detector of the selection decision operating device and outputs a remote operating signal to the transmitter. Therefore, the user can carry out the operation of the remote operating apparatus of the present invention with the selection decision operating device having a good operability, i.e. by revolution and pressing of the cylindrical member, thereby simplifying the operation.

In a preferable embodiment, the remote operating apparatus of the present invention further includes a displayer for displaying the basic controlled state, the first controlled state, and the second controlled state by receiving a signal from the controller, wherein the displayer displays independently an operation mode set value of the remote operating apparatus, an input switching set value of the remote operated apparatus, an operation state of the first operation function changing button, and an operation state of the second operation function changing button. Therefore, the user can not only suitably switch the operation function of the selection decision operating device of the remote operating apparatus but easily grasp the operation function state thereof. As a result of this, the switching of the input and the change of the operation mode of the remote operating apparatus can be on one hand suitably combined, and on the other hand suitably operated independently.

Furthermore, the remote operating apparatus system of the present invention is constructed with the above-described remote operating apparatus of the present invention and the above-described remote operated apparatus of the present invention. Therefore, even in the case of a system having a lot of connected apparatus because of the increase in the number of remote operated apparatus that are operated by the remote operating apparatus, the operability for the user can be improved.

DETAILED DESCRIPTION OF THE PREFERRED EMBODIMENTS

In the remote operating system according to the present invention, the object of improving the operability for the user has been realized in the following way. Namely, the switching of the input selector of the remote operated apparatus and the change of the operation mode of the remote operating apparatus are switched the state of the operation function of the selection decision operating device.

Hereafter, a remote operating apparatus and a remote operated apparatus according to preferable embodiments of the present invention as well as a remote operating system constituted of these apparatus will be described; however, the present invention is not limited to these embodiments.

EXAMPLE 1

Figure 1:
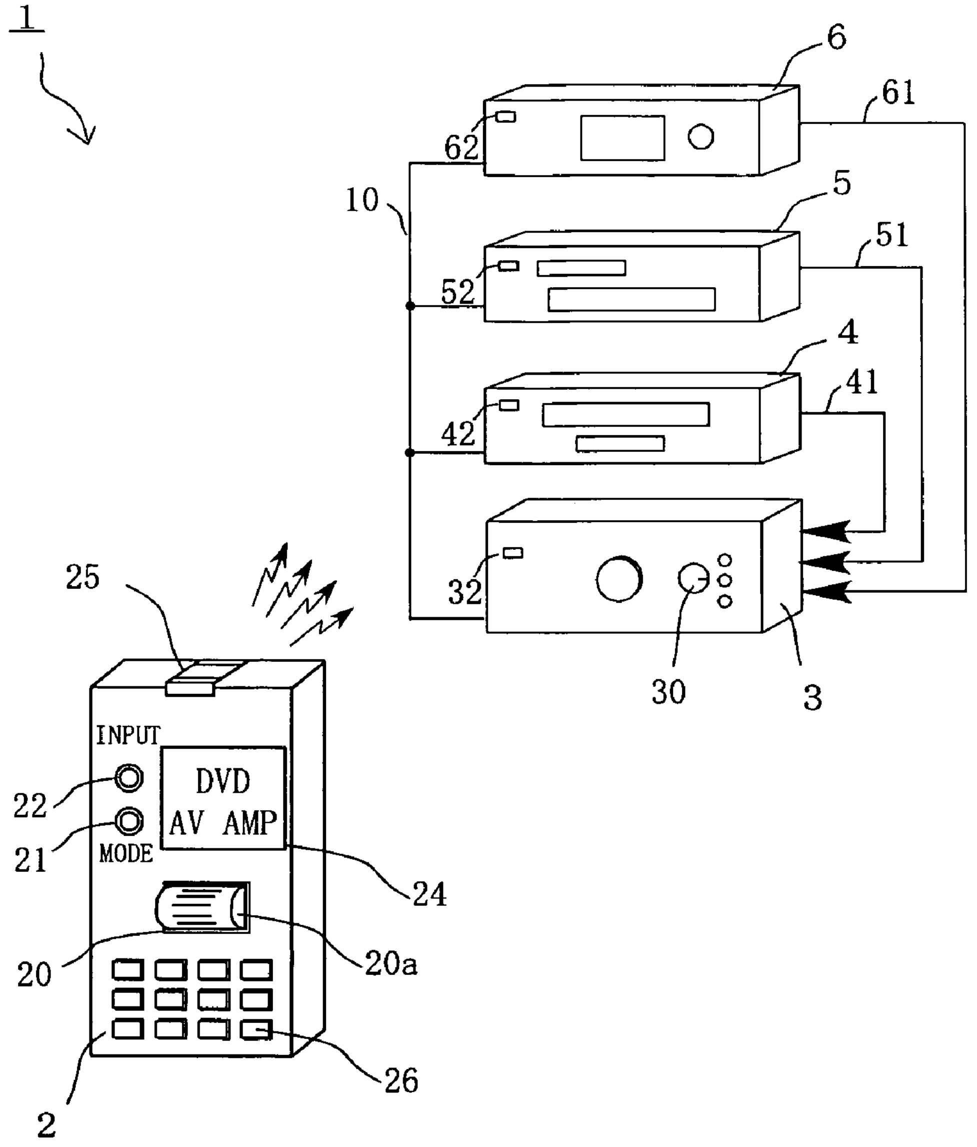
FIG. 1 is a view describing a remote operating system in accordance with the present invention.

FIG. 1 is a view for describing a remote operating system 1 according to a preferable embodiment of the present invention. Remote operating system 1 includes a remote operating apparatus 2, and remote operated apparatus 3, 4, 5, and 6. Specifically, for example, remote operating system 1 is an AV system for replay of video images and audio sounds; remote operating apparatus 2 is a remote controller; remote operated apparatus 3 is an AV amplifier; remote operated apparatus 4 is a DVD player; remote operated apparatus 5 is a CD player; and remote operated apparatus 6 is a tuner. AV system 1, of course, may include other AV apparatus not illustrated in the drawings, and the number of connected apparatus is not limited.

AV amplifier 3 includes an input selector 30 as input switching device, and the respective outputs of DVD player 4, CD player 5, and tuner 6 are connected to input selector 30 of AV amplifier 3 via output signal lines 41, 51, and 61. Therefore, the user can switch input selector 30 in accordance with the apparatus to be used, and can obtain a video image/audio sound reproduction output from AV amplifier 3. Input selector 30 may be a pair consisting of a video image signal selector for switching a video image signal and an audio sound signal selector for switching an audio sound signal, or else may be one that independently switches a video image signal and an audio sound signal.

AV amplifier 3, DVD player 4, CD player 5, and tuner 6 each include a micro computer (not illustrated) as controlling device and light-receiving windows 32, 42, 52, and 62, respectively, as receiving device for receiving a remote operating signal, and can receive a remote operating signal from remote controller 2. Here, depending on the case, it is possible to construct a system in which only AV amplifier 3 has a receiving window 32, and a micro computer may connect other apparatus via a controlling line 10 so as to transmit and receive remote operating signals. Further, controlling line 10 may be a controlling bus capable of transmitting and receiving video image/audio sound signals as well, and may be representatively IEEE1394, DVI, HDMI, or the like.

Figure 2:
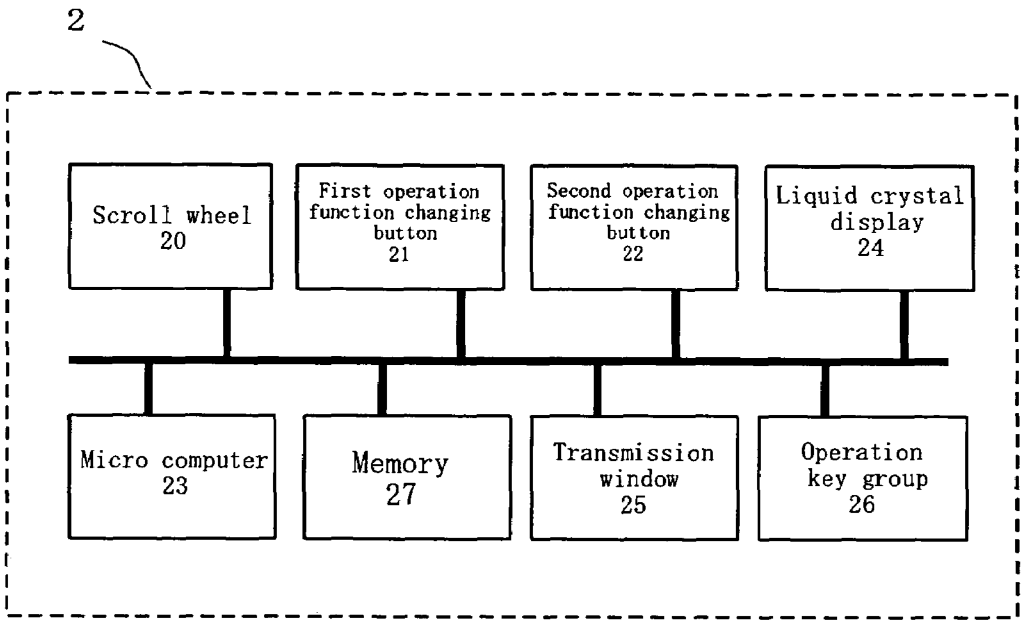
FIG. 2 is a view describing a remote operating apparatus in accordance with the present invention.

FIG. 2 is a view for describing a construction of remote controller 2 according to the present invention. Remote controller 2 includes a scroll wheel 20 as a selection decision operating device, a first operation function changing button 21 for changing the operation mode setting of remote controller 2, a second operation function changing button 22 for changing the input selector setting of AV amplifier 3, a micro computer 23 as controlling device, a liquid crystal display 24 as displaying device, a transmission window 25 as transmitting device, an operation key group 26, and a memory 27, which are connected with one another. Memory 27 is preferably storage device such as a ROM, and stores the programs that micro computer 23 executes.

A user of AV system 1 can remotely operate AV amplifier 3 and others by operating remote controller 2 to transmit a remote operating signal. The remote operating signal may be an infrared signal or a wireless electromagnetic wave signal or in some cases an electric signal sent through a wired line. Liquid crystal display 24 displays an operation mode set value of remote controller 2 as "MODE", and an input selector set value of AV amplifier 3 as "INPUT". Here, the operation mode of remote controller 2 is a state that enables remote operation of a specific AV apparatus including AV amplifier 3 with remote controller 2, so that the name of each AV apparatus may be used as the operation mode set value. Also, regarding the input selector set value, the name of the specific AV apparatus to be connected may be used as the input selector set value. For example, suppose that video image/audio sound signals are reproduced from DVD player 4. If the operation mode of remote controller 2 is set at the operation of AV amplifier 3 and the input selector is set at DVD, liquid crystal display 24 displays "DVD/AV AMP" (presented in the order of "INPUT/MODE"; the same applies hereinafter).

Scroll wheel 20 of remote controller 2 of the present invention can be selected by revolving the cylindrical member (wheel) and can be decided by pressing the cylindrical member, thereby enhancing the convenience of operation for the user. Scroll wheel 20 includes a cylindrical member (wheel) 20*a* supported to be freely revolvable and pressable, revolution detecting device for detecting the revolution of cylindrical member 20*a*, and pressing detecting device for detecting the pressing of cylindrical member 20*a*. Micro computer 23 determines selection and decision by signals from revolution detecting device and pressing detecting device of cylindrical member 20*a*, and outputs a remote operating signal to transmitting device. Further, first operation function changing button 21 and second operation function changing button 22 may be a switch such as a tact switch that can detect when the switch is pressed.

Micro computer 23 of remote controller 2 of the present invention controls the operation function of scroll wheel 20 by receiving a signal from first operation function changing button 21 or second operation function changing button 22. Namely, micro computer 23 can switch among a basic controlled state that enables one to select and decide one combination of set values among a plurality of combinations of set values, the combination constituted of an operation mode set value of remote controller 2 and an input selector set value of AV amplifier 3, by operation of scroll wheel 20, a first controlled state that enables one to select and decide an operation mode set value of remote controller 2 independently by operation of scroll wheel 20 when first operation function changing button 21 is pressed, and a second controlled state that enables one to select and decide an input selector set value of AV amplifier 3 independently by operation of scroll wheel 20 when the second operation function changing button 22 is pressed.

In the basic controlled state, scroll wheel 20 of remote controller 2 of the present invention can select and decide one combination of set values among a plurality of combinations of set values, the combination constituted of an operation mode set value of remote controller 2 and an input selector set value of AV amplifier 3. Namely, when cylindrical member 20*a* of scroll wheel 20 is revolved, the input selector can be selected, and also the operation mode of remote controller 2 of the AV apparatus corresponding to the input to input selector 30 can be selected. For example, in the case where the display of liquid crystal display 24 is "DVD/AVAMP", when a revolution of cylindrical member 20*a* of scroll wheel 20 is detected in the basic controlled state, a set value combination such as "DVD/DVD", "CD/CD" or "TUNER/TUNER" can be selected and decided. When the user decides selection by pressing cylindrical member 20*a* of scroll wheel 20 during the display of "DVD/DVD", the operation mode of remote controller 2 becomes "DVD", whereby an operation such as replay or stop of DVD player 4 can be made with operation key 26 or the like. At the same time, input selector 30 of AV amplifier 3 is switched to "DVD player", whereby the user can obtain a video image/audio sound replay output from AV amplifier 3. In this manner, in the basic controlled state, the user can not only switch input selector 30 of AV amplifier 3 but also remotely control another AV apparatus corresponding to the input simply by operation of scroll wheel 20, thereby improving the operability.

Further, in the first controlled state, scroll wheel 20 of remote controller 2 of the present invention can select and decide the operation mode set value of remote controller 2 by operation of scroll wheel 20, independently from the input selector set value of AV amplifier 3. Namely, even if cylindrical member 20*a* of scroll wheel 20 is revolved, input selector 30 is not switched, and the operation mode of remote controller 2 corresponding to another AV apparatus can be selected. For example, in the case where the display of liquid crystal display 24 is "DVD/AVAMP", when a revolution of cylindrical member 20*a* of scroll wheel 20 is detected in the first controlled state, only the operation mode of remote controller 2 can be selected and decided, in the manner like "DVD/DVD", "DVD/CD", and "DVD/TUNER". When the user decides selection by pressing cylindrical member 20*a* of scroll wheel 20 during the display of "DVD/TUNER", the operation mode of remote controller 2 becomes "TUNER", whereby the user can perform operation such as preset tuning of tuner 6 with operation key 26 or the like. During this operation, input selector 30 of AV amplifier 3 is not switched from "DVD player", whereby the user can remotely operate the tuning operation with tuner 6 while obtaining a video image/audio sound replay output from DVD player 4 and AV amplifier 3. In this way, in the first controlled state, the user can change the operation function to the state that enables remote control of another AV apparatus simply by operation of scroll wheel 20, thereby improving the operability.

Further, in the second controlled state, scroll wheel 20 of remote controller 2 of the present invention can select and decide the input selector set value of AV amplifier 3 by operation of scroll wheel 20, independently from the operation mode set value of remote controller 2. Namely, even if cylindrical member 20*a* of scroll wheel 20 is revolved, the operation mode of remote controller 2 is not switched, and input selector 30 of AV amplifier 3 can be selected. For example, in the case where the display of liquid crystal display 24 is "DVD/AVAMP", when a revolution of cylindrical member 20*a* of scroll wheel 20 is detected in the second controlled state, only input selector 30 of AV amplifier 3 can be selected and decided, in the manner like "CD/AVAMP" and "TUNER/AVAMP". When the user decides selection by pressing cylindrical member 20*a* of scroll wheel 20 during the display of "CD/AVAMP", input selector 30 can be switched to "CD" while the operation mode of remote controller 2 is maintained to be "AVAMP". In this way, in the second controlled state, the user can switch the input source to be reproduced to another AV apparatus simply by operation of scroll wheel 20, thereby improving the operability.

Regarding the controlled state of scroll wheel 20 of remote controller 2, liquid crystal display 24 displays the basic controlled state, the first controlled state, and the second controlled state by receiving a signal from micro computer 23. Namely, liquid crystal display 24 serving as displaying device displays independently the operation mode set value of remote controller 2, the input selector set value of AV amplifier 3, the operation state of first operation function changing button 21, and the operation state of second operation function changing button 22. For example, in the basic controlled state, the series of letters "DVD/AVAMP" may be displayed, while in the first controlled state or in the second controlled state, the series of letters corresponding to the changeable set value may be displayed in blinking. Alternatively, as displaying device, first operation function changing button 21 and second operation function changing button 22 may be provided as self-glowing switches, whereby in the first controlled state, first operation function changing button 21 may glow; in the second controlled state, second operation function changing button 22 may glow; and in the basic controlled state, both first operation function changing button 21 and second operation function changing button 22 may glow.

Therefore, the user can suitably switch the operation function of scroll wheel 20 of remote controller 2, and can easily recognize the state of the operation function via liquid crystal display 24 or the displaying device constituted of self-glowing first operation function changing button 21 and second operation function changing button 22. As a result of this, the switching of input and the change of the operation mode of remote controller 2 can be operated suitably in a combination or on the other hand suitably independently, thereby improving the operability for the user.

Figure 3:
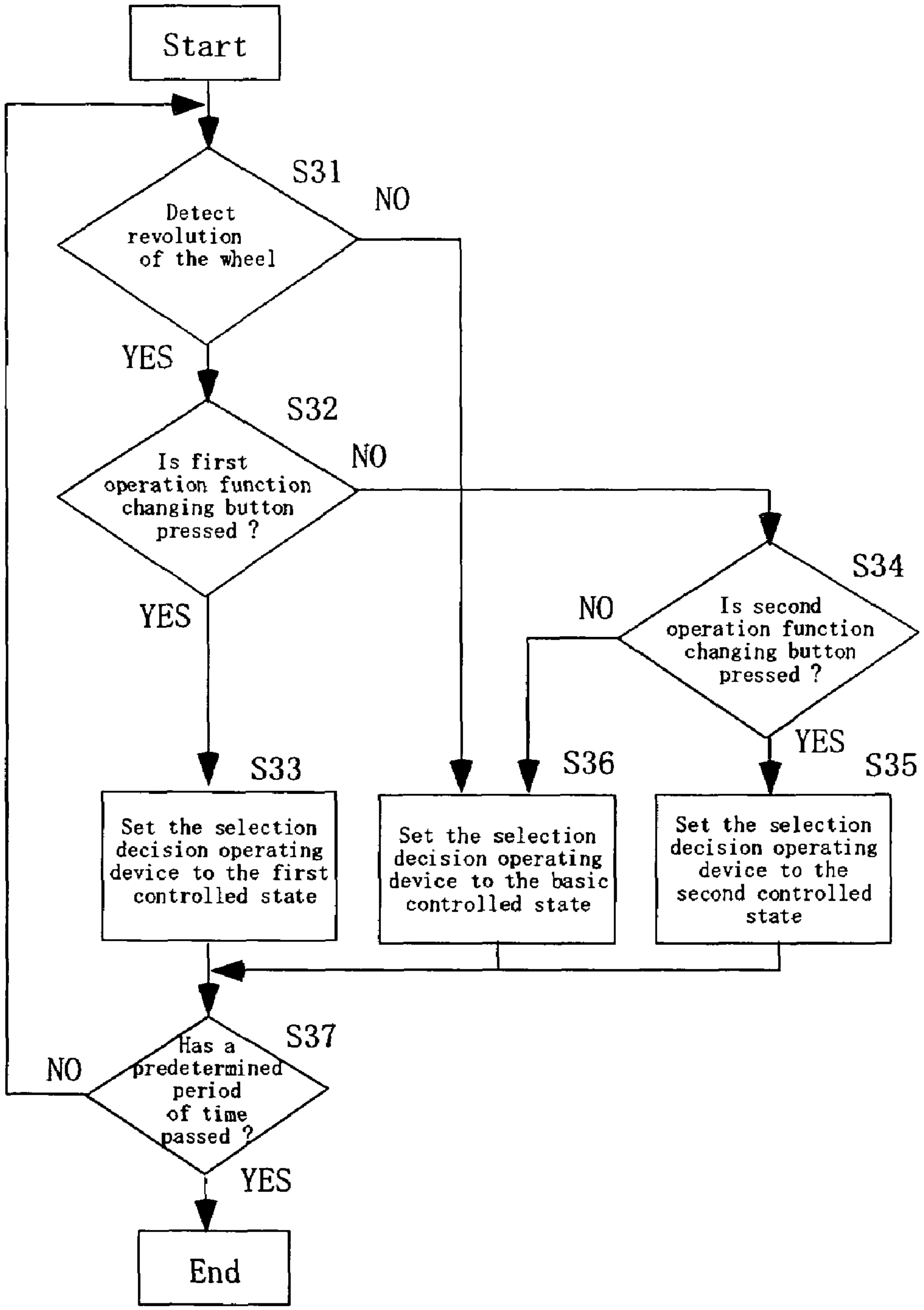
FIG. 3 is a flow chart describing a remote operating apparatus in accordance with the present invention.

FIG. 3 is a flowchart for switching the operation function of scroll wheel 20 to the basic controlled state, the first controlled state, and the second controlled state. Micro computer 23 carries out the switching of the operation function by receiving a signal from scroll wheel 20, first operation function changing button 21, or second operation function changing button 22. When a revolution of cylindrical member 20*a* of scroll wheel 20 is detected by the revolution detecting device (S31), micro computer 23 determines whether first operation function changing button 21 or second operation function changing button 22 was pressed a predetermined period of time before the detection of revolution (S32, S34). If first operation function changing button 21 was pressed, the operation function of scroll wheel 20 is switched to the first controlled state (S33). If second operation function changing button 22 was pressed, the operation function of scroll wheel 20 is switched to the second controlled state (S35). If neither first operation function changing button 21 nor second operation function changing button 22 was pressed, the operation function of scroll wheel 20 is switched to the basic controlled state (S36). Namely, the operation function of scroll wheel 20 can be switched reflecting the operation function change that the user performed before revolving cylindrical member 20*a* of scroll wheel 20, thereby realizing a remote controller that the user can easily operate.

Micro computer 23 ends the switching of the operation function of scroll wheel 20 when a predetermined period of time passes after the final receipt of a signal from scroll wheel 20 or first operation function changing button 21 or second operation function changing button 22 (S37). However, before the predetermined period of time passes, the user may switch the operation function again by pressing first operation function changing button 21 or second operation function changing button 22, so that when a revolution of cylindrical member 20*a* is detected, micro computer 23 again determines whether first operation function changing button 21 or second operation function changing button 22 was pressed a predetermined period of time before the revolution of cylindrical member 20*a*. Therefore, the operation function of scroll wheel 20 is switched to the finally selected controlled state. In other words, remote controller 2 of the present invention can suitably switch the operation function of scroll wheel 20, so that the operation mode of remote controller 2 and input selector 30 of AV amplifier 3 can be easily switched, thereby improving the operability for the user.

Figure 4:
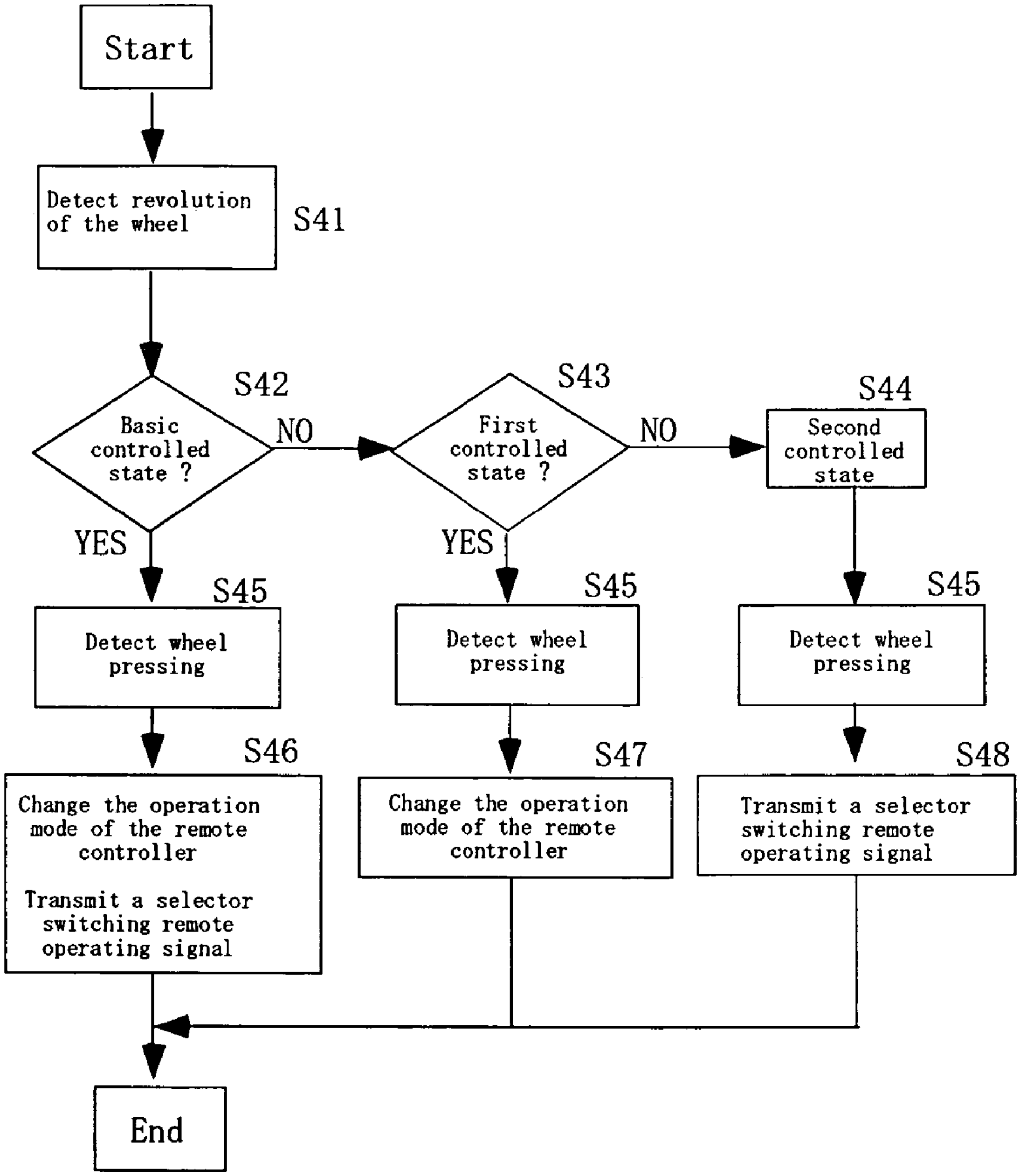
FIG. 4 is a flow chart describing a remote operating apparatus in accordance with the present invention.

FIG. 4 is a flowchart by which micro computer 23 transmits a remote operating signal for switching the operation mode setting of remote controller 2 and input selector 30 of AV amplifier 3 when the operation function of scroll wheel 20 is switched to the basic controlled state, the first controlled state, and the second controlled state. When a revolution of cylindrical member 20*a* of scroll wheel 20 is detected by revolution detecting device (S41), micro computer 23 determines whether the current state is the basic controlled state (S42), the first controlled state (S43), or the second controlled state (S44). As a result of this, when a pressing of cylindrical member 20*a* is detected in the basic controlled state (S45), the functions of operation key group 26 are switched to the functions in the selected operation mode of remote controller 2, and also a remote operating signal is output to the transmitting device to switch input selector 30 of AV amplifier 3 (S46). When a pressing of cylindrical member 20*a* is detected in the first controlled state, the functions of operation key group 26 are switched to the functions in the selected operation mode of remote controller 2 (S47) When a pressing of cylindrical member 20*a* is detected in the second controlled state, a remote operating signal is output to the transmitting device to switch input selector 30 of AV amplifier 3 (S48).

Specifically, the detection of the revolution of cylindrical member 20*a* of scroll wheel 20 may be set at a time interval of 10 to 1000 msec, and the predetermined period of time for determining whether first operation function changing button 21 or second operation function changing button 22 was pressed before the revolution of cylindrical member 20*a* may be set to be 3 to 10 sec. Further, the predetermined period of time for determining whether the user switched the operation function by operating first operation function changing button 21 or second operation function changing button 22 again may be set to be 3 to 10 sec. Further, the predetermined period of time for determining whether the user operated cylindrical member 20*a* of scroll wheel 20 again may be set to be 3 to 10 sec. This setting provides that, even if the user switched the operation function of scroll wheel 20 to the first controlled state or the second controlled state, when the user has stopped the operation to leave remote controller 2 alone for a while whereby no revolution of cylindrical member 20*a* has been detected (S31), the current state will be turned to the basic controlled state unless the user operates first operation function changing button 21 or second operation function changing button 22. Therefore, the user can recognize that the initial state is such a state that the operation function of scroll wheel 20 is in the basic controlled state, thereby avoiding the occurrence of confusion.

Here, in the present invention, even if the user has stopped operation to leave remote controller 2 alone for a while whereby the operation function of scroll wheel 20 has been turned to the basic controlled state, the operation mode set value of remote controller 2 and the input selector set value of AV amplifier 3 are maintained to be the set values that have been selected and decided at the last time. In other words, even if the operation mode of remote controller 2 has been further changed by operation, it is not necessary to maintain the switched operation mode only for a predetermined period of time and to restore the operation mode to the operation function of the apparatus connected to the current input selector set value of AV amplifier 3 after the predetermined period of time passes. In the present invention, the user can switch the operation function of scroll wheel 20 singly. Therefore, even if the user has stopped operation to leave remote controller 2 alone for a while, one can avoid a situation in which even the operation mode of remote controller 2 automatically returns, so that the user can perform operation still reflecting the intention of the user.

As described above, in remote controller 2 of the present invention, the operation function of scroll wheel 20 can be suitably switched, so that the user can easily control the operation mode of remote controller 2 and input selector 30 of AV amplifier 3, thereby improving the operability for the user. Further, the user can remotely operate another AV apparatus corresponding to the input connected to input selector 30 of AV amplifier 3, thereby improving the operability of the total AV system 1 for the user. In particular, in recent years in which an increasing number of AV apparatus are connected to input selector 30 of AV amplifier 3 and various kinds of signal lines are present for video image signals and audio sound signals, the change of the operation mode to be operated with remote controller 2 can be combined, thereby improving the operability. On the other hand, the increased number of AV apparatus can be easily operated independently.

Here, remote operating system 1 of the present invention is not necessarily limited to the case of the AV system of the above-described Example. In addition to a system for a general home use, the present invention can be applied to an industrial karaoke apparatus and an AV system to be mounted on an automobile.

EXAMPLE 2

Figure 5:
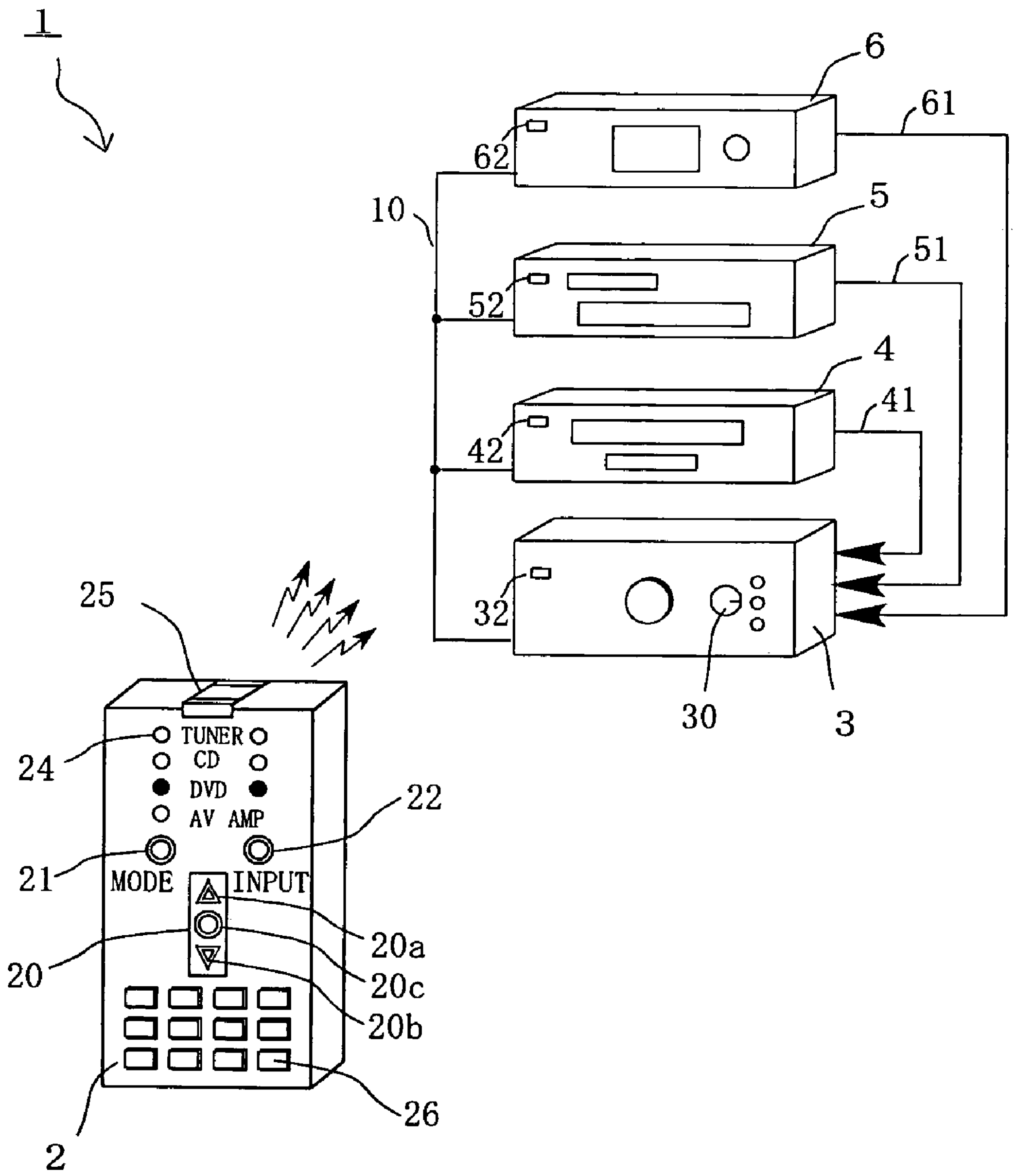
FIG. 5 is a view describing a remote operating system in accordance with the present invention.

FIG. 5 is a view describing a remote operating system 1 according to another preferable embodiment of the present invention. A remote controller 2 of AV system 1 includes a selection decision operating device 20, a first operation function changing button 21, a second operation function changing button 22, a micro computer 23 (not illustrated) as controlling device, a displaying LED series 24 as displaying device, a transmission window 25 as transmitting device, and an operation key group 26. Selection decision operating device 20 includes a combination of selection upward-shifting button 20*a*, selection downward-shifting button 20*b*, and selection deciding button 20*c*. A user of AV system 1 can remotely operate AV amplifier 3 and others by operating remote controller 2 to transmit a remote operating signal. Here, the description of the elements other than remote controller 2 is similar to that of Example 1 and is not made.

At this time, the user can suitably switch the operation function of selection decision operating device 20 of remote controller 2 to the basic controlled state, the first controlled state, and the second controlled state. Here, first operation function changing button 21 and second operation function changing button 22 are self-glowing switches, where first operation function changing button 21 glows in the first controlled state; second operation function changing button 22 glows in the second controlled state; and both first operation function changing button 21 and second operation function changing button 22 glow in the basic controlled state. Therefore, the user can easily recognize the state of the operation function of selection decision operating device 20.

Further, displaying LED series 24 displays the operation mode set value of remote controller 2 as "MODE" and the input selector set value of AV amplifier 3 as "INPUT" by turning on respective LEDs. For example, in the case of reproducing DVD player 4, when selection decision operating device 20 is operated in the basic controlled state, both first operation function changing button 21 and second operation function changing button 22 glow, and further "MODE:DVD" and "INPUT:DVD" of displaying LED series 24 are lit.

Selection decision operating device 20 includes a combination of selection upward-shifting button 20*a*, selection downward-shifting button 20*b*, and selection deciding button 20*c*. For example, if selection upward-shifting button 20*a* is further pressed in the basic controlled state, "MODE: CD" and "INPUT:CD" can be selected, and the selection can be decided by pressing selection deciding button 20*c*. Representative other devices that can be used as selection decision operating device 20 of remote controller 2 of the present invention in this manner include a jog dial, a joy stick, a cross-shaped cursor and the like, and may be one that the user can easily operate selection and decision. Selection decision operating device 20 outputs signals of selection and decision to micro computer 23 and outputs a remote operating signal to the transmitting device.

It goes without saying that, if the first controlled state is set by pressing first operation function changing button 21 or if the second controlled state is set by pressing second operation function changing button 22, the change of "MODE" which is the change of the operation mode of remote controller 2 and the change of "INPUT" which is the switching of the input can be suitably operated independently by button operation of selection decision operating device 20. Therefore, the user can not only switch input selector 30 of AV amplifier 3 but remotely control another AV apparatus corresponding to the input simply by operation of selection decision operating device 20, thereby improving the operability.

A remote operating apparatus and a remote operated apparatus of the present invention as well as a remote operating system constituted of these apparatus can be used in a system having a remote operating apparatus and a remote operated apparatus provided with input switching device and connected to a lot of apparatus. For example, it may be a personal computer system connecting a lot of peripheral apparatus.

What is claimed is:

1. A remote operating apparatus comprising:

a selection decision operating device;

a controller;

and a second operation function changing button for changing an operation function of the selection decision operating device, wherein the controller controls the operation function of the selection decision operating device by receiving a signal from the second operation function changing button and switches between:

a basic controlled state that enables one to select and decide one combination of set values among a plurality of combinations of set values, the combination including an operation mode set value of the remote operating apparatus identifying a remote operated apparatus operated in accordance with the operation mode set value, and an input switching set value of a remote operated apparatus having an input selector and to which the remote operated apparatus operated in accordance with the operation set mode is connected, by operation of the selection decision operating device, and;

a second controlled state that enables one to select and decide an input switching set value of the remote operated apparatus having the input selector independently from the operation mode set value of the remote operating apparatus by operation of the selection decision operating device when the second operation function changing button is pressed; and the controller controls:

in the basic controlled state, selection of the operation mode set value of the remote operating apparatus and the input switching set value of the remote operated apparatus having the input selector in fixed combination, and in the second controlled state, selection of the input switching set value of the remote operated apparatus having the input selector independently of the operation mode set value.

2. The remote operating apparatus of claim 1, wherein the operation mode set values of said remote operating apparatus include:

an operation mode set value corresponding to the remote operated apparatus having the input selector, and an operation mode set value corresponding to another remote operated apparatus connected to the input selector of the remote operated apparatus having the input selector.

3. The remote operating apparatus of claim 1, further comprising:

a display device for displaying the basic controlled state, or the second controlled state by receiving a signal from the controller, and the display device displays independently an operation mode set value of said remote operating apparatus, an input switching set value of the remote operated apparatus having the input selector by blinking, or an operation state of the second operation function changing button by self-glowing.

4. A remote operated apparatus comprising:

a receiver for receiving a remote operating signal that is transmitted from a remote operating apparatus of claim 1;

a controller; and an input switcher, wherein the controller controls the input switcher in accordance with said input switching set value of the remote operating signal.

5. A remote operating apparatus system comprising;

the remote operating apparatus of claim 1 and;

the remote operated apparatus having the input selector;

the remote operated apparatus having the input selector comprising a receiver for receiving a remote operating signal that is transmitted from the remote operating apparatus of claim 1, a controller, and an input switcher, wherein the controller controls the input switcher in accordance with said input switching set value of the remote operating signal.

6. A remote operating apparatus comprising:

a selection decision operating device;

a controller, a first operation function changing button and a second operation function changing button for changing an operation function of the selection decision operating device; wherein the controller controls the operation function of the selection decision operating device by receiving a signal from the first operation function changing button or the second operation function changing button and switches among:

a basic controlled state that enables one to select and decide one combination of set values among a plurality of combinations of set values, the combination including an operation mode set value of the remote operating apparatus identifying a remote operated apparatus operated in accordance with the operation mode set value, and an input switching set value of a remote operated apparatus having an input selector and to which the remote operated apparatus operated in accordance with the operation set mode is connected, by operation of the selection decision operating device, and;

a first controlled state that enables one to select and decide an operation mode set value of the remote operating apparatus independently from the input switching set value of the remote operated apparatus having the input selector by operation of the selection decision operating device when the first operation function changing button is pressed; and a second controlled state that enables one to select and decide an input switching set value of the remote operated apparatus having the input selector independently from the operation mode set value of the remote operating apparatus by operation of the selection decision operating device when the second operation function changing button is pressed; and the controller controls:

in the basic controlled state, selection of the operation mode set value of the remote operating apparatus and the input switching set value of the remote operated apparatus having the input selector in fixed combination, and in the first or second controlled state, selection of the operation mode set value and the input switching set value of the remote operated apparatus having the input selector independently of one another.

7. The remote operating apparatus of claim 6, wherein the operation mode set values of said remote operating apparatus include:

an operation mode set value corresponding to the remote operated apparatus having the input selector, and an operation mode set value corresponding to another remote operated apparatus connected to the input selector of the remote operated apparatus having the input selector.

8. The remote operating apparatus of claim 6, further comprising:

a display device for displaying the basic controlled state, the first controlled state, or the second controlled state by receiving a signal from the controller, and the display device displays independently an operation mode set value of said remote operating apparatus, an input switching set value of the remote operated apparatus having the input selector by blinking, an operation state of the first operation function changing button, or an operation state of the second operation function changing button by self-glowing.

9. A remote operated apparatus comprising:

a receiver for receiving a remote operating signal that is transmitted from a remote operating apparatus of claim 1;

a controller; and an input switcher, wherein the controller controls the input switcher in accordance with said input switching set value of the remote operating signal.

10. A remote operating apparatus system comprising;

the remote operating apparatus of claim 6 and;

the remote operated apparatus having the input selector; the remote operated apparatus having the input selector comprising a receiver for receiving a remote operating signal that is transmitted from the remote operating apparatus of claim 6, a controller, and an input switcher, wherein the controller controls the input switcher in accordance with said input switching set value of the remote operating signal.

* * * * *